(12) United States Patent
Palm et al.

(10) Patent No.: US 6,235,257 B1
(45) Date of Patent: *May 22, 2001

(54) PROCESS WATERS IN PHOSPHATE MANUFACTURING

(76) Inventors: Gordon F. Palm; R. George Hartig, both of 2729 Oakland Ave., Lakeland, FL (US) 33803

(*) Notice: Subject to any disclaimer, the term of this patent is extended or adjusted under 35 U.S.C. 154(b) by 0 days.

This patent is subject to a terminal disclaimer.

(21) Appl. No.: 08/269,979

(22) Filed: Jul. 1, 1994

Related U.S. Application Data

(63) Continuation of application No. 08/033,519, filed on Mar. 18, 1993, now abandoned, which is a continuation-in-part of application No. 07/990,052, filed on Dec. 14, 1992, now Pat. No. 5,316,748, which is a continuation-in-part of application No. 07/727,606, filed on Jul. 9, 1991, now abandoned, which is a continuation-in-part of application No. 07/669,643, filed on Mar. 14, 1991, now Pat. No. 5,171,452, and a continuation-in-part of application No. 07/782,989, filed on Oct. 28, 1991, now abandoned, which is a continuation-in-part of application No. 07/669,643, filed on Mar. 14, 1991, now Pat. No. 5,171,452.

(51) Int. Cl.$^7$ ............................ C01B 25/16; C01B 25/32
(52) U.S. Cl. .................. 423/320; 210/710; 210/724; 423/157.4; 423/170
(58) Field of Search ................... 423/319, 320, 423/321 R, 170, 490; 210/710, 712, 718, 724, 726, 737, 747, 772

(56) References Cited

U.S. PATENT DOCUMENTS

| | | | |
|---|---|---|---|
| 3,625,648 | * 12/1971 | Randolph | 423/484 |
| 4,320,012 | * 3/1982 | Palm et al. | 423/321.1 |
| 4,402,923 | * 9/1983 | Lang | 423/166 |
| 4,698,163 | * 10/1987 | Zibrida | 210/713 |
| 4,777,027 | * 10/1988 | Davister et al. | 423/320 |
| 5,112,499 | * 5/1992 | Murray et al. | 423/490 |
| 5,316,748 | * 5/1994 | Palm et al. | 210/710 |
| 5,366,640 | * 11/1994 | Palm et al. | 210/724 |

OTHER PUBLICATIONS

Pierre Becker, *Phospates and Phoshoric Acid—Raw Materials, Technology, and Economics of the Wet Process*, published by Marcel Dekker, Inc. (1983), pp. 471–496.*

* cited by examiner

Primary Examiner—Wayne Langel
(74) Attorney, Agent, or Firm—Charles A. McClure

(57) ABSTRACT

Modification of phosphoric acid manufacturing provides improved process waters: decontaminated water pH-adjusted to be only slightly acidic, scrubber process water, gypsum stack water, and a composite of the latter two waters. The composite water undergoes two-stage neutralization with clarification, eliminating precipitatable contaminants, in forming the pH-adjusted water, which in turn is useful in forming scrubber process water or gypsum stack water, as needed, Resulting gypsum stacks and rainfall surge ponds, having been made relatively fluoride-free through such processing modification, and preferably also having been lined, supersede previous gypsum stacks and acid gypsum ponds—whether lined or not.

1 Claim, 7 Drawing Sheets

| DESCRIPTION | SYMBOL | pH LEVEL |
|---|---|---|
| SULFURIC ACID<br>ACID PROCESS WATER (APW)<br>SCRUBBER PROCESS WATER (SPW)<br>FILTER WASH EFFLUENT<br>GYPSUM SLURRY<br>GYPSUM STACK WATER (GSW) | • • • • •<br>+ + + + +<br>• • • • •<br>• • ■ • •<br>• • • • • | VERY ACIDIC<br>E.G. 1.5-2.0 |
| PARTLY NEUTD. COMPOSITE PROCESS WATER<br>PARTLY NEUTD. COMPOSITE PROCESS UNDERFLOW<br>FLOCCULENT<br>LIMESTONE<br>LIMESTONE SLURRY | ++ ++ ++<br>+ ■ + ■ +<br>‖‖‖‖‖‖‖<br>▲ ▲ ▲<br>▲ ▲ ▲ ▲ ▲ | MODERATELY ACIDIC<br>E.G. 3.5-4.5 |
| pH-ADJUSTED WATER | I O I O I O I | SLIGHTLY ACIDIC<br>E.G. 6 |
| FRESH WATER & WATER VAPOR<br>COOLING WATER<br>STEAM | o o o o o o o o<br>o o<br>— — — | NEUTRAL<br>E.G. 7 |
| OVER-NEUTD. COMPOSITE PROCESS WATER<br>OVER-NEUTD. COMPOSITE PROCESS WATER UNDERFLOW<br>LIME<br>LIME SLURRY | ⊖ ⊖ ⊖ ⊖<br>⊟ ⊟ ⊟ ⊟<br>△ △ △ △<br>△ △ △ △ | VERY ALKALINE<br>E.G. 11 |

LEGEND

FIG. 6

PROCESS WATERS IN PHOSPHATE MANUFACTURING

This application is a continuation of application Ser. No. 08/033,519 filed Mar. 18, 1993, abandoned, which is (to be abandoned upon the filing of the present application) was a continuation-in-part (i) of our patent application Ser. No. 07/990,052 filed Dec. 14, 1992, (issued as U.S. Pat. No. 5,316,748) which was a continuation-in-part of our application Ser. No. 07/727,606 filed Jul. 9, 1991 (since abandoned), itself a continuation-in-part of our application Ser. No. 07/669,643 filed Mar. 14, 1991 and issued as U.S. Pat. No. 5,171,452; and (ii) of our application Ser. No. 07/782,989 filed Oct. 28, 1991, since abandoned itself a continuation-in-part of application Ser. No. 07/669,643 filed Mar. 14, 1991 (issued as U.S. Pat. No. 5,171,452).

TECHNICAL FIELD

This invention relates to the generation, use, and treatment of wet-process phosphoric acid process waters, eliminating conventional acid pond water and cooling ponds and increasing product recovery, thereby minimizing environmental disturbance and/or product loss.

BACKGROUND OF THE INVENTION

Wet-process manufacturing of phosphoric acid is so standardized that its procedures are well known and are described as conventional in authoritative texts. An accepted reputable authority upon this subject is Pierre Becker, *PHOSPHATES AND PHOSPHORIC ACID—Raw Materials, Technology, and Economics of the Wet Process*, published by Marcel Dekker, Inc. (New York, 1983). Of particular interest is chapter 9 thereof, entitled "What to Do with Gypsum" (pp. 471–496). The present inventors consider Becker's identified treatise as the prime authority on conventional wet-process phosphoric acid practice, from which the present invention departs as described below.

Such conventional processing produces by-product gypsum stacks from which very acidic water drains into extensive cooling ponds, often measuring several hundred acres each. Conventional gyp[sum] pond water is extremely acid, usually having a pH of about 1.8–2.0. Also, it is composed of weak phosphoric acid, as in a range from 1.3–2.5% $P_2O_5$, fluosilicic acid and soluble fluorides ranging from 0.5–1.8%, sulfuric acid and soluble sulfates ranging from 0.5–1.6%, plus soluble contaminating metal salts and radioactive compositions Conventional acid gypsum pond water retains in solution—and so is likely to pollute ground water with—residual phosphoric acid and soluble fluorides, dissolved metal impurities and radioactive compounds, and it emits fluoride-containing gases. This is a serious drawback of conventional wet-process phosphoric acid manufacturing.

Attempts to limit resulting air, water, and soil contamination have had limited success. Randolph in U.S. Pat. No. 3,625,648 proposed a rather diffuse range of neutralization of acidic gypsum pond waters effective to reduce some contaminants by precipitation. The present inventors also undertook to reduce fluoride contamination, Palm as in U.S. Pat. No. 3,699,212 and Hartig as in U.S. Pat. No. 3,720,757, and jointly they subsequently developed a two-stage neutralization of recirculated acid waters, as in U.S. Pat. No. 4,320,012.

Other examples of ameliorative efforts include treating gypsum pond waters to remove metallic ions as in Mills U.S. Pat. No. 4,303,532; to recover calcium fluoride as in Hirko & Mills U.S. Pat. No. 4,171,342 or O'Neill U.S. Pat. No. 4,374,810; or to remove calcium fluoride so as to provide a reduced fluoride solution for use in wet ball-milling of phosphate rock as in O'Neill et al. in U.S. Pat. No. 4,472,368. Hirko et al. U.S. Pat. No. 4,171,342; Zibrida in U.S. Pat. Nos. 4,657,680 and 4,698,163; and Murray et al. in U.S. Pat. No. 5,112,499.

The industry and the inventors, despite such efforts, have not successfully eliminated the dependency of conventional wet-process phosphoric acid manufacturing upon acid pond water with its load of contaminants threatening pollution of adjacent air, soil, and water.

The present invention, while retaining benefits of the present inventors' identified early joint invention, is directed to modifying the wet-process manufacturing of phosphoric acid with the result of substantially eliminating pollution attributable to conventional gypsum pond waters and minimizing the loss of $P_2O_5$ while doing so.

SUMMARY OF THE INVENTION

A primary object of this invention is to eliminate conventional acid pond water cooling ponds and their attendant pollution.

Another object of the invention is to supersede a conventional gypsum stack, often constructed unlined on raw land, with a gypsum stack improved by having a liner against ground water contamination.

A further object of this invention is to replace conventional contaminant-bearing acid gypsum pond water by new gypsum stack water whose contamination is limited to reduced F and $P_2O_5$ content.

Yet another object of the invention is to minimize $P_2O_5$ losses in wet-process phosphoric acid manufacturing.

A still further object is to limit water discharged into surface waters to decontaminated water of compatible pH.

In general, the objects of the present invention are attained by providing new not-so-acidic process waters in place of conventional wet-process acid gypsum pond water, which is discontinued and is superseded. Such new acidic process waters result from aqueous collection of waste gases and liquids from the conventional process.

Circulating clean water with a pH of about 6 to 7 through conventional wet-process flash coolers and evaporators/condensers, and mopping up of $P_2O_5$ process leaks, spills, and wash liquids provides an acid process water (APW) useful in preliminary washing of process gypsum filter cake. The resulting APW is supplied via filter cake washing to the wet-process phosphoric acid reactor, thus recovering substantially all water-soluble $P_2O_5$ normally lost in conventional processing. Some of its fluosilicic acid reacts with phosphate rock therein, producing phosphoric acid, precipitating some fluorides, and reducing the consumption of sulfuric acid. This acid process water is contained in process tanks, pipelines, and like equipment, well segregated from contact with external air, soil, and water.

Scrubbing vent gases from the process reactor and other process equipment captures gaseous fluorides. Partially neutralized scrubber water at a pH of about 4 to 5—typically 4.5—and clarified is thereby freed of most fluorides and of other contaminants insoluble at that pH. This water is useful in part in wet-rock grinding at the head-end of the wet-process, and in other substantial part is alkalized to a pH of about 10.5 to 12—typically 11—freeing it of contaminants insoluble at this pH (but soluble at lower pH) and clarified, then re-acidified to a nearly neutral pH between 6 and 7. The latter decontaminated pH-adjusted water (here called pH-AW) is non-scaling and is useful for such purposes as filter wash, scrubber water make-up, cooling tower water make-up, acid process water makeup, limestone slurrying, and lime slaking and slurrying.

Alternatively, pH-AW may be discharged to surface water after ascertaining that their respective pH's match reasonably closely.

Washed gypsum filter cake is slurried with part of the water drained from stacked gypsum (i.e., gypsum stack water or GSW), and whatever GSW is not so recycled is fed to the first of two neutralizing stages in which scrubber water is processed, as above.

Other aspects of the present invention, together with means and methods for attaining the various objects, will be apparent from the following description and accompanying diagrams of preferred embodiments, which are presented by way of example rather than limitation.

SUMMARY OF THE DRAWINGS

FIG. 6 is a LEGEND, especially for FIGS. 1 to 4, emphasizing pH classification and iconic representation of the various flows.

Figure 1:
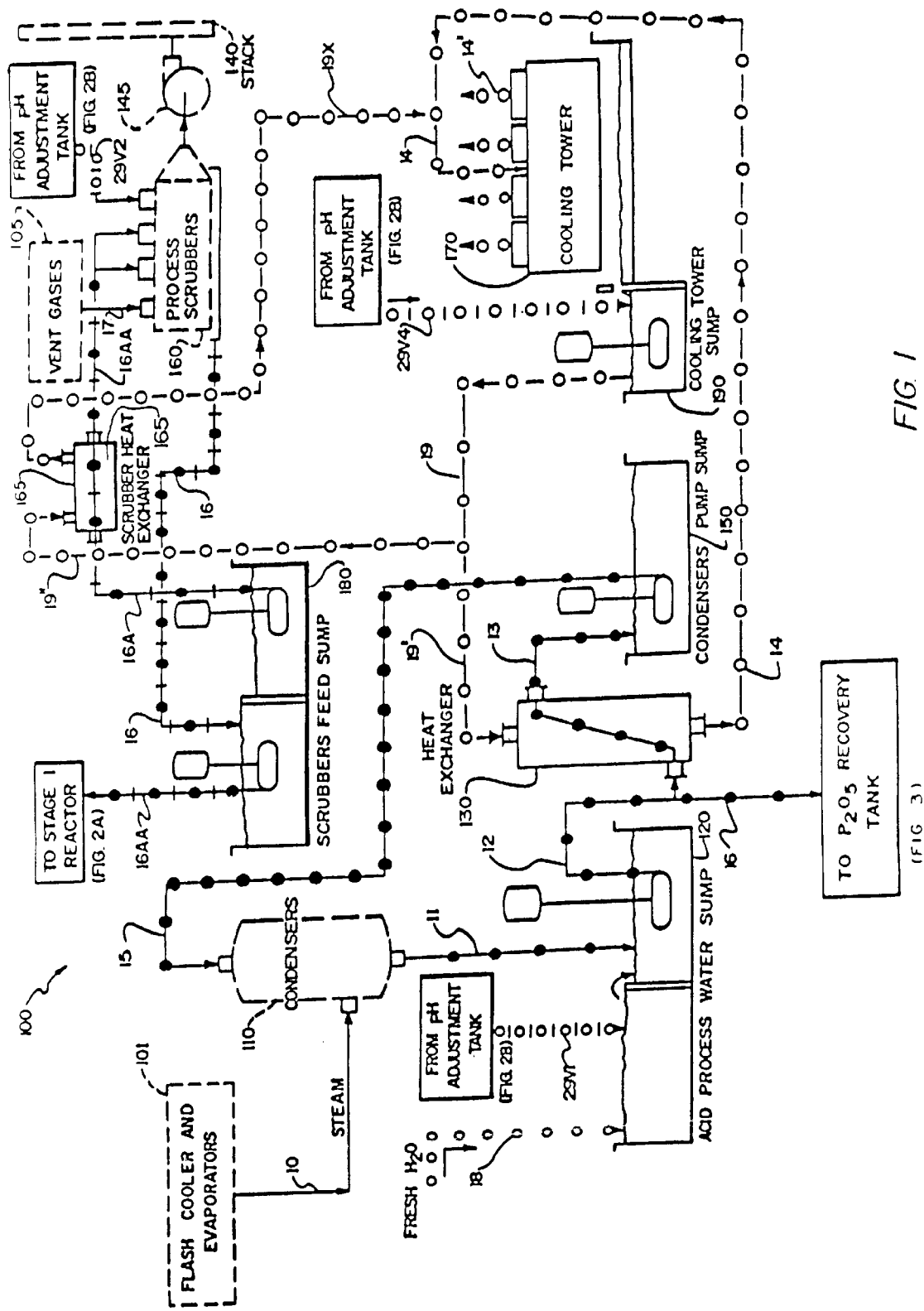
FIG. 1 is a first schematic diagram, featuring generation of acid process water and scrubber process water by this invention.

An item-by item description of FIGS. 1 to 4 precedes a description of the process as such, so as to minimize interruption of the diagram description by interjected process commentary—such as composition, concentration, phase, pH, and/or temperature—and to minimize reference characters in the subsequent process description.

In FIGS. 1 to 4, some existing components of the conventional wet-processing equipment are represented by dashed outline, whereas major components of the invention are shown with a solid outline in block or like schematic form. Equipment Components are identified by name and by 3-digit numbers, the first digit usually being the same as the Figure number to aid identification.

Figure 2A:
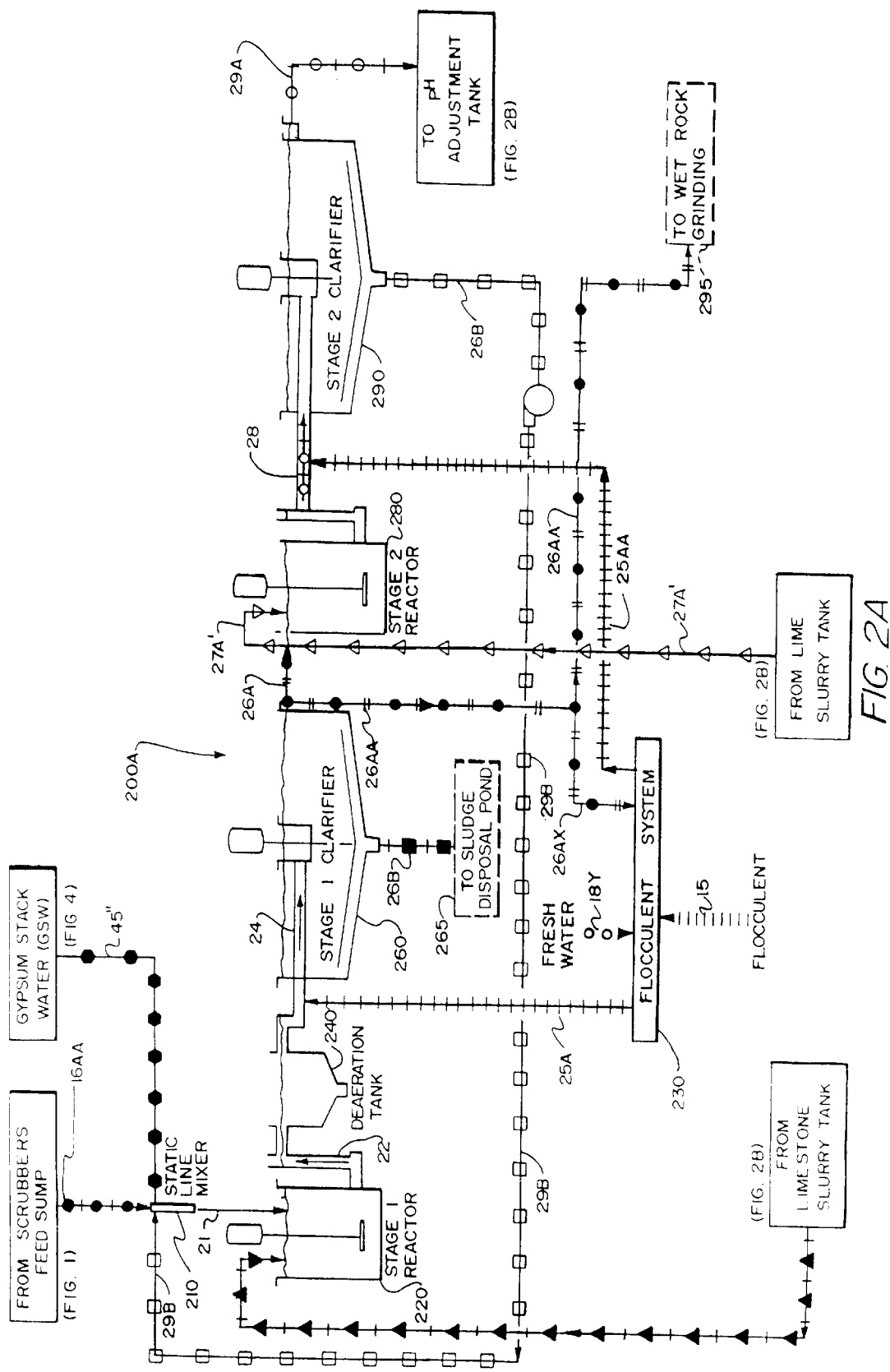
FIG. 2A is a part of a second schematic flow diagram, featuring two-stage neutralization and clarification of scrubber process water (SPW) and gypsum stack water (GSW) together as composite process water, with disposition of respective overflow waters and underflow sludges, according to this invention.
Figure 2B:
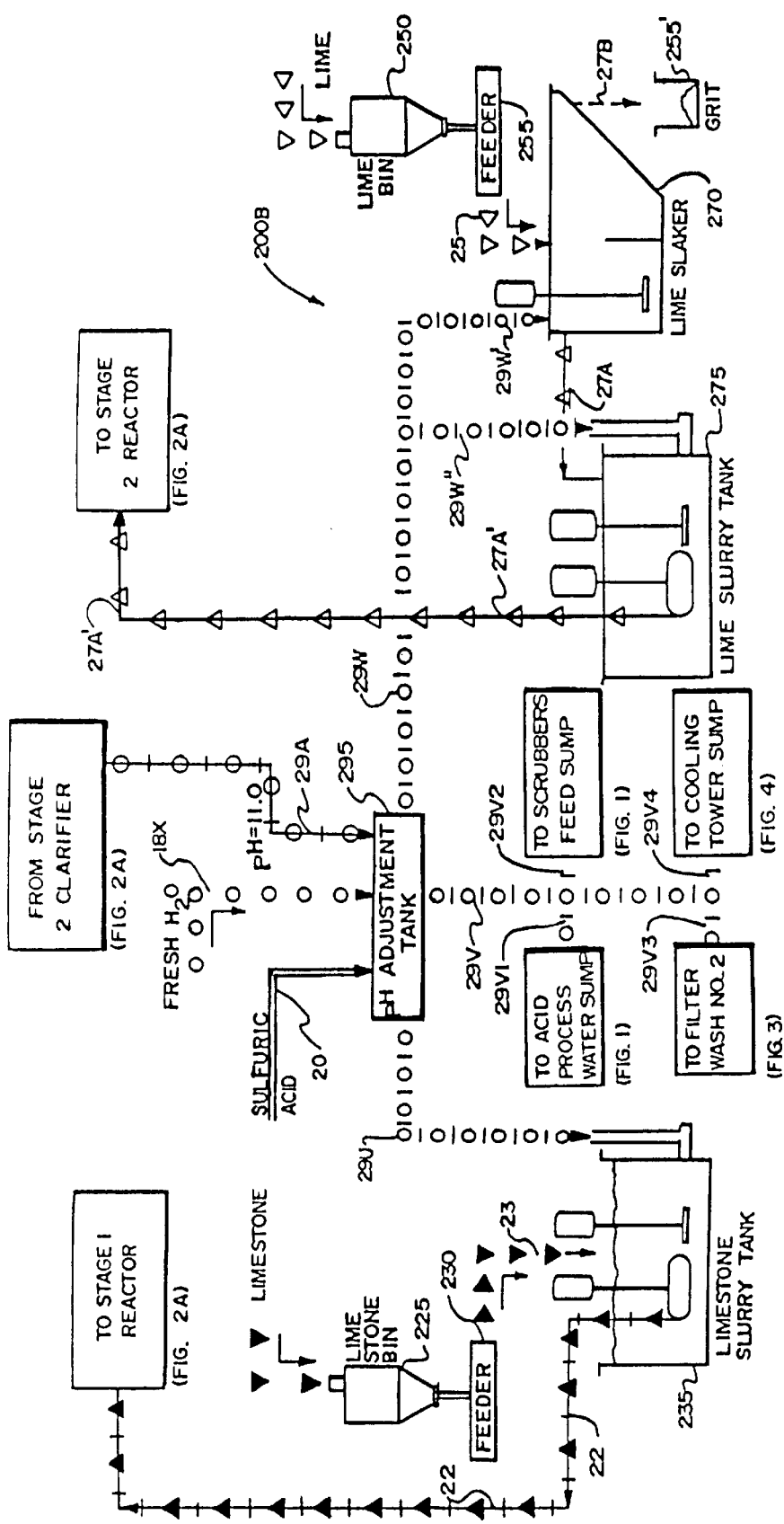
FIG. 2B is another part of such second schematic flow diagram, featuring limestone slurrying for the first stage and lime slaking and slurrying for the second stage, pH adjustment of the treated composite water, and distribution of the resulting pH-adjusted water, according to this invention.
Figure 3:
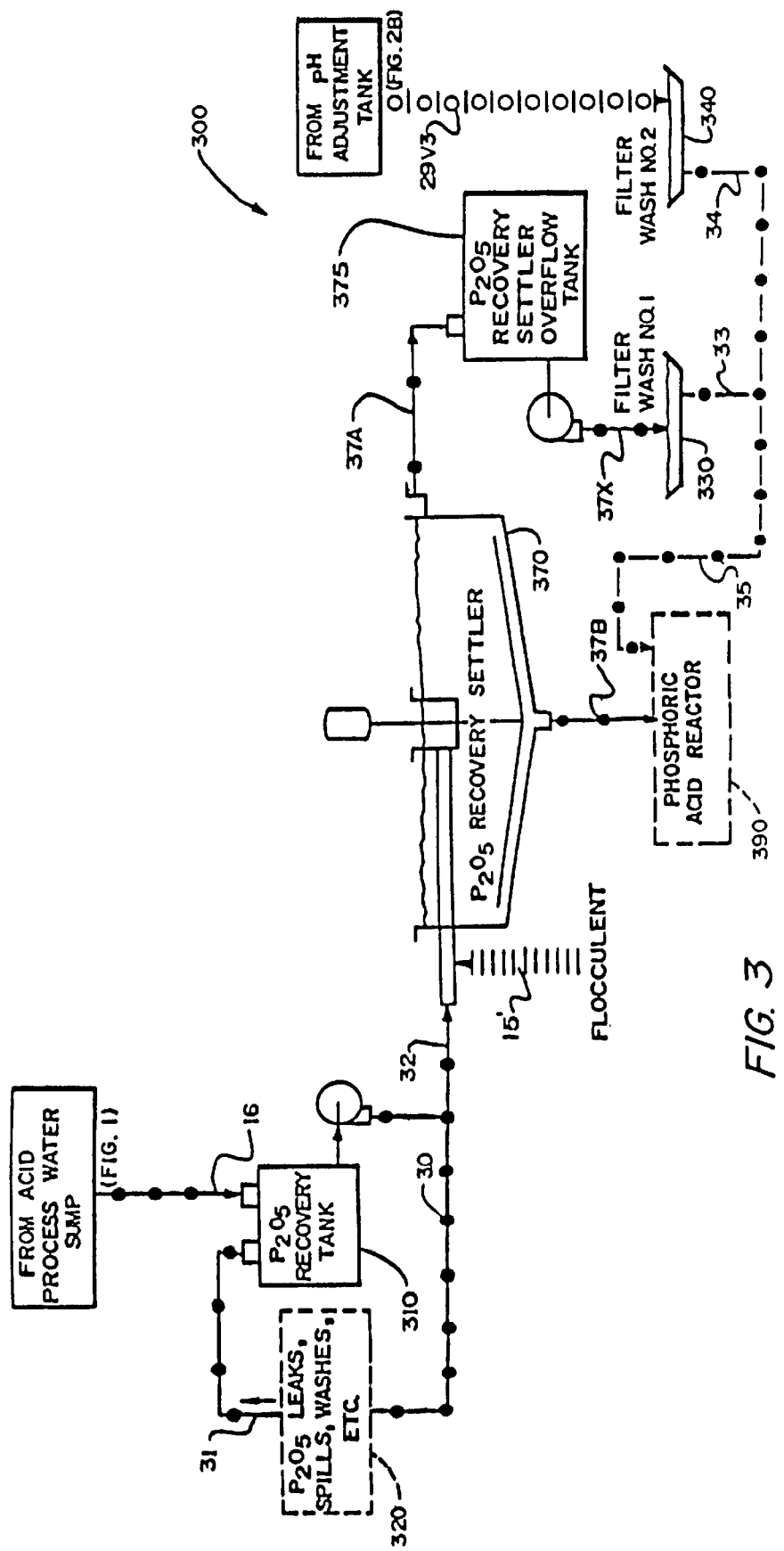
FIG. 3 is a third schematic diagram, featuring filter washes and phosphoric acid recovery according to this invention.
Figure 4:
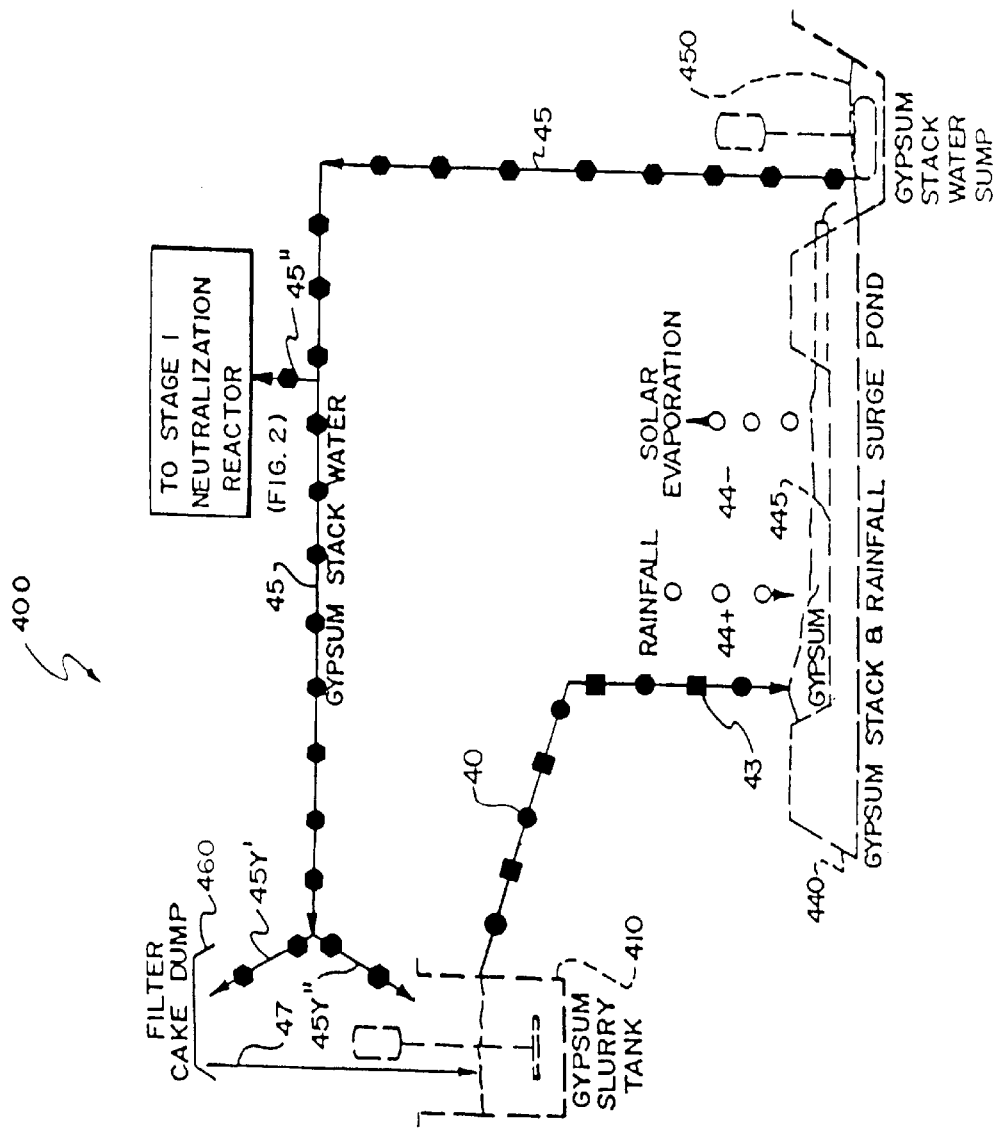
FIG. 4 is a fourth schematic flow diagram, featuring gypsum stack water generation and treatment by this invention.
Figure 5:
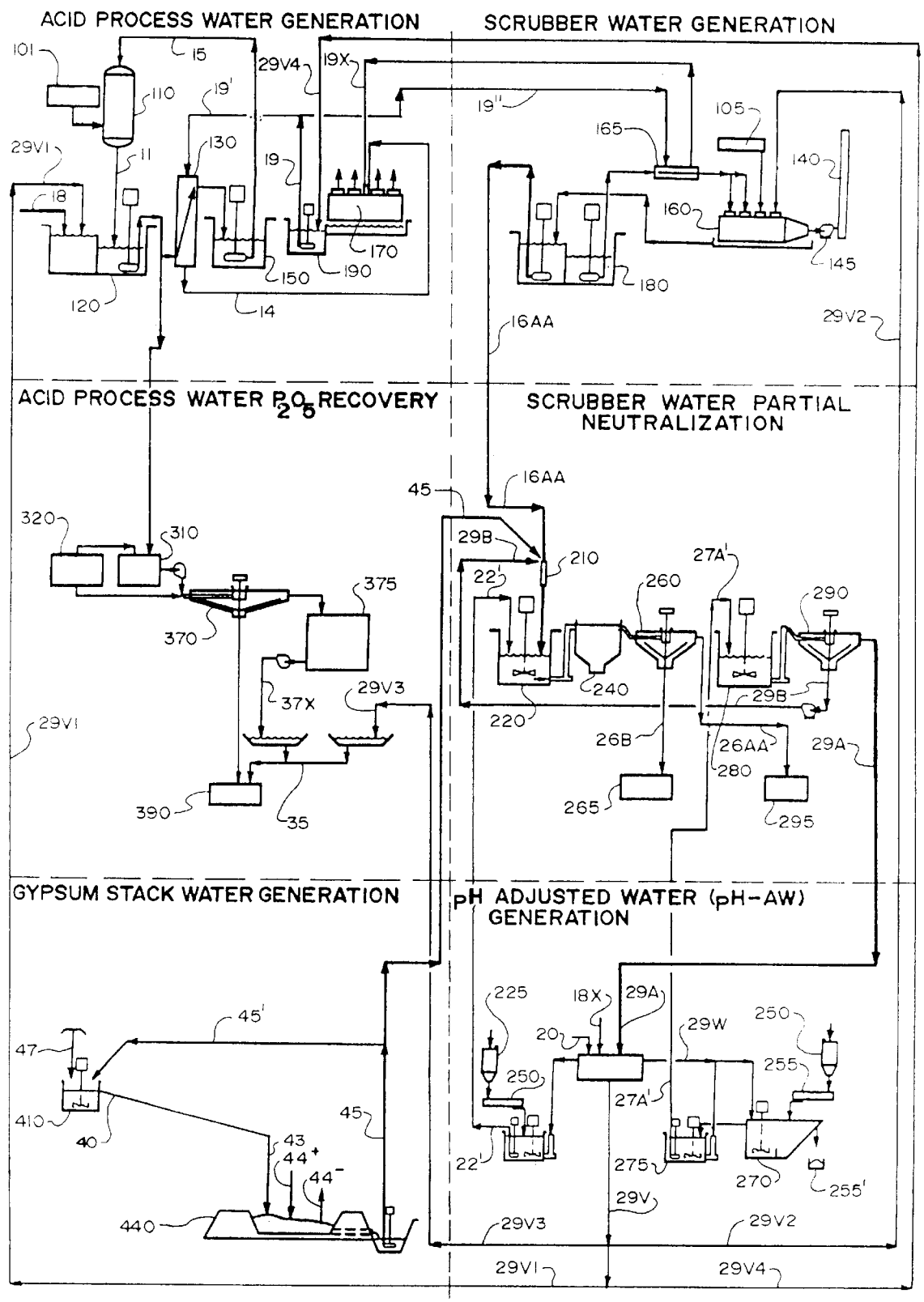
FIG. 5 is a composite schematic of the foregoing diagrams, with some rearrangement and simplification, emphasizing water flows.

FIG. 5 re-presents the foregoing diagrams (on reduced scale) in two columns of three boxes each (dashed lines), corresponding at the upper left and right to FIG. 1, at mid-right to FIG. 2A, at lower right to FIG. 2B, at mid-left to FIG. 3 and at lower left to FIG. 4.

The FIG. 6 LEGEND shows iconographically respective inflow and outflow lines identified in FIGS. 1 to 5 by two-digit numbers—often the first two digits of an interconnected component. Suffixes for two-digit numbers include A ("above") for overflows, and B ("below") for underflows; also X, Y, etc., for line extensions; and single or double primes or repeated letters for branches.

FIG. 6 provides a ready-reference diagrammatic guide to input and output water and other aqueous liquids, slurries, etc. under headings of Description, Symbol (iconographic), and pH Level.

The LEGEND has five main horizontal sections: Very Acidic (pH of 1.5–2) six entries; Moderately Acidic (pH of 3.5–4.5) five entries; Slightly Acidic (pH near 6) one entry; Neutral (pH of about 7) three entries; Very Alkaline (pH near 11) four entries.

Very acidic entries include Sulfuric Acid, as double line; Acid Process Water (APW), single line beaded with filled circles; Scrubber Process Water (SPW), single line with filled circles and alternate cross-hatching; Filter Wash Effluent, dashed line, filled circles; Gypsum Slurry, single line, alternate filled circles and squares; Gypsum Stack Water (GSW), alternate filled hexagons.

Moderately Acidic entries: Partly Neutralized Composite Process Water (SPW & GSW together), single line with filled circles and alternate double cross-hatching; Partly Neutralized Composite Process Water Underflow, single line with filled squares and alternate cross-hatching; Flocculent, cross-hatching (without and with line); Limestone, filled triangles; and Limestone slurry, single line with filled triangles and alternate cross-hatching.

The only Slightly Acidic entry is pH-Adjusted Water, shown in single line with open circles and alternate cross-hatching.

Neutral entries are Fresh Water and Water Vapor, open circles (without line); Cooling Water, dashed line with open circles; and Steam (line only).

The Very Alkaline entries are Over-Neutralized Composite Process Water (SPW & GSW together), single line with alternate open circles and cross-hatching; Over-Neutralized Scrubber Process Water and Gypsum Stack Water (SPW & GSW together) Underflow, single line with open squares; Lime, open triangles (no line); and Lime Slurry, single line with open triangles.

DESCRIPTION OF THE INVENTION

FIG. 1 shows schematically the first processing area, 100, of this invention. STEAM containing gaseous fluorides and entrained phosphoric acid from phosphoric acid manufacture is fed via line 10 from FLASH COOLERS & EVAPORATORS 101 (outlined in dashed lines) common in phosphoric acid wet-process operations to CONDENSERS 110 (dashed outline indicating present in existing process), where it is collected as acid process water (APW) via line 11 (shown beaded with filled circles) in ACID PROCESS WATER SUMP 120. Such acid process water circulates in substantial part via line 12 through HEAT EXCHANGER 130 and via line 13 to CONDENSERS PUMP SUMP 150, from which it is recycled via line 15 back to the condensers, and is discharged via line 11 from the CONDENSERS into ACID PROCESS SUMP 120. A purge portion from the ACID PROCESS WATER SUMP branches from line 12 goes via line 16 to a $P_2O_5$ RECOVERY TANK in FIG. 3.

Also in FIG. 1 PROCESS SCRUBBERS 160 (dashed outline as process apparatus) receive VENT GASES 105 from elsewhere in the wet-process. Blower 145 forces scrubbed gases up and out of STACK 140 (similarly outlined) and into the surrounding atmosphere. The resulting warm scrubber process water (SPW) returns via line 16 to SCRUBBERS FEED SUMP 180, and a purge line 16AA of SPW goes to the the STAGE 1 REACTOR in FIG. 2A, while most of the SPW is recirculated via line 16A through Scrubber Heat Exchanger 165, from which (now cooled) it is recycled to PROCESS SCRUBBERS 160 via line 16AX.

The Scrubber Heat Exchanger receives cooling water from COOLING TOWER SUMP 190 via lines 19 and 19". Warm cooling water returns via line 19X to COOLING TOWER 170. Makeup water from a pH Adjustment Tank in FIG. 2B, is fed into COOLING TOWER SUMP 190 via line 29V4 on demand. Cooling water enters the top of HEAT EXCHANGERS 130 via line 19', leaves via bottom line 14, and is pumped to the top of COOLING TOWER 170, in which it is cooled by evaporation (open circles 14' with upward arrow), and from which it drains (downward arrow) to COOLING TOWER SUMP 190 and is recirculated through lines 19 and 19' to HEAT EXCHANGERS 130. Upon demand makeup water from the pH Adjustment Tank (in FIG. 2B) is provided to the feed side of the ACID PROCESS WATER SUMP 120 via line 29V1; to the last stage of PROCESS SCRUBBERS 160 via line 29V2; and to the COOLING TOWER SUMP via line 29V4. Fresh makeup water may also be added via line 18 to the feed portion of the ACID PROCESS WATER SUMP, as during dry seasons.

FIGS. 2A and 2B show schematically a pair of second processing areas, 200A and 200B of this invention. In FIG. 2A, STAGE 1 REACTOR 220 receives via line 21 from STATIC LINE MIXER 210 a Composite Process Water mixture of Scrubber Process Water (SPW) fed via line 16AA from SCRUBBERS FEED SUMP 180 in FIG. 1, and Gypsum Stack Water (GSW) from FIG. 4 via line 45", plus underflow slurry via line 29B from STAGE 2 CLARIFIER 290 downstream in this view. They mix and react together and with limestone slurry in STAGE 1 REACTOR 220 supplied via line 22 from LIMESTONE SLURRY TANK in FIG. 2B. The STAGE 1 REACTOR contents pass via line 22 to DEAERATION TANK 240 and via line 24 to STAGE 1 CLARIFIER 260. The underflow slurry from the clarifier is forwarded via line 26B to SLUDGE DISPOSAL POND 265 located elsewhere (broken outline). The partly neutralized overflow from first CLARIFIER 260 goes in part via line 26A to STAGE 2 REACTOR 280, and in other part via lines 26A and 26AA to WET ROCK GRINDING 295, also indicated (broken lines) as located elsewhere. FLOCCULENT is received into flocculent system 230 from an external source via line 15 (cross-hatching only), and receives initial FRESH WATER diluent via line 18Y, and is further diluted by Stage 1 Clarifier overflow water via line 26AX. The diluted flocculent (cross-hatched line) is fed via line 25A to STAGE 1 CLARIFIER 260, and via line 25AA to STAGE 2 CLARIFIER 290.

As noted above, the underflow slurry from second CLARIFIER 290 in FIG. 2A goes via line 29B to STATIC LINE MIXER 210, where it dissolves in the acidic mix of SPW and GSW, and goes via line 21 with the rest of the mixer output to STAGE 1 REACTOR 220. A resulting clear alkaline or "over-neutralized" overflow goes from STAGE 2 CLARIFIER 290 via line 29A to pH ADJUSTMENT TANK 295 (in FIG. 2B), where it is joined by pH-adjusting SULFURIC ACID from line 20 before being further used according to this invention.

At the left in FIG. 2B, LIMESTONE is fed into LIMESTONE BIN 225 and is discharged onto feeder 230, which forwards it via path 23 to LIMESTONE SLURRY TANK 235, into which water from pH-ADJUSTMENT TANK 295 is fed via line 29U. The resulting limestone slurry is fed via line 22 into neutralization STAGE 1 REACTOR 220 (FIG. 2A), raising the pH from below 2 to about 4 ½. LIME is fed at the right in FIG. 2B into LIME BIN 250 and via FEEDER 255 and path 25 to LIME SLAKER 270, where it is slaked with pH-adjusted water from line 29W' branched from line 29W. Accumulating grit is removed via line 27B to grit collector 255' to prevent equipment degradation. Lime slurry from the LIME SLAKER 270 overflows via line 27A into LIME SLURRY TANK 275, where it is diluted with pH-adjusted water via branch line 29W". The resulting diluted lime slurry is fed via line 27A' to STAGE 2 REACTOR 280 (FIG. 2A).

In pH ADJUSTMENT TANK 295 of FIG. 2B, the pH of the over-neutralized Gypsum Stack Water received from the STAGE 2 CLARIFIER of FIG. 2A at a pH of about 11 is fed into pH ADJUSTMENT TANK 295, where by addition of Sulfuric Acid the pH is reduced, preferably to a slightly acidic pH of about 6 (nearly neutral). Fresh water is added via line 18X to pH ADJUSTMENT TANK 295 as may be required for dry-season water balance. The output pH-Adjusted Water (pH-AW) is then used as non-scaling process water.

Such pH-AW uses in FIG. 1 include make-up to the acid process water sump via line 29V1, make-up to the scrubber feed sump via line 29V2, and make-up to the cooling tower via line 29V4. Another use for the pH-Adjusted Water is via line 29V3 to Filter Wash No. 2 (FIG. 3). Uses in limestone slurrying and lime slaking and slurrying were already mentioned in description of this view (FIG. 2B).

FIG. 3 shows schematically a third processing area, 300, featuring $P_2O_5$ recovery. Warm acid process water from ACID PROCESS WATER SUMP 120 of FIG. 1 is fed via line 16 into $P_2O_5$ RECOVERY TANK 310. Overflow from the tank is circulated via line 30 for use on LEAKS, SPILLS, WASHES, ETC. 320 elsewhere. The resulting collected water is fed via line 31 to $P_2O_5$ RECOVERY TANK 310, and via line 32 to $P_2O_5$ RECOVERY SETTLER 370, which receives Flocculent via line 15' and overflows via line 37A to $P_2O_5$ RECOVERY SETTLER OVERFLOW TANK 375. The underflow slurry is fed via line 37B to process PHOSPHORIC ACID REACTOR 390 (shown in dashed outline). Two FILTER WASH steps are shown, the first performed with warm acid process water from $P_2O_5$ RECOVERY SETTLER 370 via line 37X, and the second with pH-adjusted process water via line 29V3 from the pH-Adjustment Tank (FIG. 2B). Wash water from FILTER WASH NO. 1 (330) via line 33, and from FILTER WASH NO. 2 (340) via line 34, combine in line 35. After usage as one or more successive counter-current filter cake washes, the combined wash waters (as resulting No. 2 filtrate) then proceed to PHOSPHORIC ACID REACTOR 390 for dissolved $P_2O_5$ recovery.

FIG. 4 shows schematically the last processing area, 400, of this invention, utilizing a gypsum stack with a rainfall surge pond of a type usual in wet-process phosphoric acid manufacturing but now with important distinctions. Gypsum filter cakes from the plant's FILTER CAKE DUMP 460 via path 47 and recirculated gypsum stack water (GSW) from GYPSUM STACK WATER SUMP 450 (shown in dashed outline) via sluice line 45Y' and slurry line Y" are mixed together in GYPSUM SLURRY TANK 410 (also in dashed outline). The resulting gypsum slurry proceeds via path 40 and is spread onto GYPSUM STACK 440, which has adjacent RAINFALL SURGE POND 445. Both stack and pond have an impermeable underliner theeunder as noted in FIG. 4 (not shown separately), and they receive water as RAINFALL (44+) and lose water therefrom by SOLAR EVAPORATION (44−) Overflow from the surge pond gathers in GYPSUM STACK WATER SUMP 450 and is recirculated via line 45 and branch line 45' to sluicing gypsum cakes in FILTER CAKE DUMP 460 via branch line 45Y' and directly into GYPSUM SLURRY TANK 410 via branch line 45Y". Gypsum stack water not so employed goes via branch line 45" to STAGE 1 REACTOR 260 (FIG. 2A).

The generation and application of various wet-process waters according to this invention can be readily understood from the foregoing diagrams and their accompanying description, in the light of the operational information given below and with the aid of the FIG. 5 composite, wherein prominent components and flow paths are re-presented within in a condensed view with somewhat reduced detail.

FIG. 5 is divided into six panels (three rows of two columns) corresponding schematically, as noted previously, to FIGS. 1 to 5. Its top row, like FIG. 1, takes in-place wet-process equipment as points of departure and shows Acid Process Water (APW) Generation at the left, and Scrubber Process Water (SPW) Generation at the right. The middle panel at the right, like FIG. 2A, shows Composite Process Water Neutralization, following mixing together of SPW from the upper right panel or FIG. 1, with Gypsum Stack Water (GSW) from the lower left panel or FIG. 4, to form the Composite Process Water. The lower right panel, like FIG. 2B, shows pH Adjusted Water (pH-AW) Generation. The middle panel at the left, like FIG. 3, shows Acid Process Water $P_2O_5$ Recovery. The lower left panel, like FIG. 4, shows Gypsum Stack Water (GSW) Generation.

According to this invention, not only acid process water (APW) and scrubber process water (SPW) but also other or makeup waters are based upon a decontaminated pH-adjusted water (pH-AW). This pH-AW is the clarified effluent from the two-stage neutralization system. In other words, the pH-AW, not only is decontaminated according to this inventive process, it also is distributed throughout the system to bootstrap the various useful waters of the invention very neatly.

The overall process is described operationally in more detail below, with minimum repetition of the foregoing numerical references but with appropriate comment about conditions prevailing, or changes occurring, at various locations and times. Departures from whatever knowledge a reader has of conventional practice will be apparent, bearing in mind that two or more components or flow circuits comprise apparatus or method combinations rather than aggregations of individual parts or steps, even though one or more of the parts or steps may be otherwise familiar to persons ordinarily skilled in the conventional wet-process manufacture of phosphoric acid.

Acid process water (APW) is generated from pH-AW and is used as a once-through water, for makeup in the wet-process phosphoric acid plant, while simultaneously recovering most of the miscellaneous $P_2O_5$ "losses" that occur in conventional processing. In the wet-process condenser circuit, pH-AW is added to a circulating flow of APW. Steam from flash coolers and evaporators of a wet-process acid plant is condensed with circulating APW at about 35° C. (95° F.), thereby warming to about 50° C. (122° F.) to 55° C. (131° F.). The warm water is cooled in heat exchangers by a separate isolated circuit of cooling water recirculating from there to a cooling tower and back in a range of about 30° C. (86° F.) to 50° C. (122° F.). The APW absorbs substantially all gaseous fluorides evolved by the flash coolers and evaporators, as well as collecting entrained phosphoric acid. Concentrations are usually in the range of about 6000 to about 18000 (typically about 12000) parts per million (ppm) F as fluorides and a like amount of P as $P_2O_5$. A purge stream from the APW sump tank precludes accumulation above such concentrations—and is sent to the $P_2O_5$ recovery tank.

APW in the tank is circulated to plant areas to recover $P_2O_5$ from spills and leaks, and is used for washdowns. A purge stream is withdrawn and is sent to the $P_2O_5$ recovery settler for removal of suspended solids to prevent blinding of the filter cake when washed with APW. Solids-free APW is used for the first filter cake wash to provide about 60% of the process makeup water to the process and, in so doing, to recover about 80–85% of the miscellaneous $P_2O_5$ losses to the process. In contrast, conventional operations use acid pond waters to slurry the gypsum, which is dewatered and stacked. The phosphoric acid present in moisture in the stacked gypsum is thereby lost to the process. APW is very acidic, not having been treated with limestone or other neutralizing agent, and is non-scaling. In addition to increasing $P_2O_5$ recovery, some of the the fluosilicic acid in the APW going into the phosphoric acid reactor will react with the phosphate rock to produce phosphoric acid, removing the fluorides by precipitation, and saving on sulfuric acid usage.

Scrubber process water (SPW) is generated from pH-AW and also is used as a once-through water. The pH-AW is introduced into the last stage of the scrubbers and, by circulating around the process scrubbers, substantially absorbs all the gaseous fluorides—$P_2O_5$ content is negligible, especially in modern plants with wet-rock grinding. The scrubber heat exchanger, using cooling tower water, cools the scrubber water from about 100° F. to 95° F. for more efficient scrubbing. The recirculated water rate to the scrubber is on the order of 25 to 35 gal per thousand cubic feet of gas. The fluoride content ranges from about 4,000 to 12,000 ppm F, depending upon the phosphate rock used, the manner in which the filter recycle acid and sulfuric acid are fed to the reactor, and the process used (i.e., dihydrate or hemi-hydrate). A purge stream used to control fluoride concentration goes to the first-stage reactor for fluoride removal.

The first filter wash volume, with warm APW as already noted, approaches about 1.4 displacements of the filter cake water. The second filter cake wash is performed with clear non-scaling pH-AW, wherein about one displacement wash volume of the filter cake water is effective to remove APW in the filter cake, thereby improving $P_2O_5$ recovery.

Approximately one percent of water-soluble $P_2O_5$ (lost in gypsum filter cake in the conventional phosphoric acid wet-process) is non-recoverable regardless of steps taken. The water from both washes is returned to the plant phosphoric acid reactor for $P_2O_5$ recovery, while the washed filter cake goes into the gypsum slurry tank.

Also fed to the gypsum slurry tank is gypsum stack water for slurrying the cake. The slurry from the gypsum slurry tank is mixed thoroughly and then is spread on the gypsum stack and so dewatered. Water drains from the gypsum stack into an adjoining rainfall surge pond, which increases in level thereby and from rainfall as it occurs—and also loses water by evaporation. The gypsum stack water sump receives the gypsum stack water (and rainfall) from the rainfall surge pond. The remaining gypsum stack water (GSW) not used to slurry the cake is sent from the sump to the two-stage neutralization reactor for removal of insoluble (or insolubilizable) contaminants via the underflow route.

Contaminants in the gypsum stack water of this invention are limited to those in the washed gypsum cake. Whereas conventional acid gypsum pond water has a fluorine (as F) concentration in the range of 0.5 to 1.8%, the gypsum stack water of this invention is in the range of 0.4 to 0.6%. The corresponding $P_2O_5$ concentrations are 1.3 to 2.5% conventionally vs. 1.0 to 2.0 for the present invention.

The gypsum stack and adjacent rainfall surge pond are underlain by one or more impermeable layers to prevent the accumulated water from seeping into surface or subsurface waters. Some sites may have an adequate underlying natural clay layer (e.g., a half meter with a permeability of $10^{-7}$). More commonly, polymeric film material is emplaced specifically to shield the environment from such seepage. The polymeric composition may be a hydrocarbon, such as high density polyethylene (HDPE), or similar material, as a continuous film of suitable thickness (e.g., 60 mil) and number of layers.

The process of this invention is balanced so that no material accumulates to excess and no required material depletes excessively. The operating cost is not penalized in achieving drastically increased environmental acceptability and actually is reduced through increased recovery of $P_2O_5$ and correspondingly decreased containment requirement for acids, heavy metals and radioactive compounds.

It will be understood that this invention can be practiced at a new location where no wet-process phosphoric acid plant ever existed or an existing conventional plant can be so modified as described in more detail in our copending application first mentioned above.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

What is claimed is:

1. In wet-process manufacturing of phosphoric acid, also productive of waste gases, waste gypsum solids as gypsum filter cake and slurry, and liquid drainage therefrom, containing as contaminants soluble fluorides, metal salts, and radioactive compounds, at a pH of about 2, the improvement comprising washing waste gypsum filter cake with nearly neutral non-scaling process water produced by the following steps:

scrubbing some of said waste gases and combining the resulting liquid with liquid drainage from the waste gypsum; and partially neutralizing and clarifying the combined liquids to a pH of about 4.5, removing insoluble contaminants in the underflow, then alkalizing and clarifying the clarified liquid to a pH of about 11, removing more insoluble contaminants in the underflow; and then re-acidifying the resulting clarified decontaminated liquid to a pH of about 6 to 7.

* * * * *